United States Patent
Gallegos et al.

(10) Patent No.: US 11,689,670 B2
(45) Date of Patent: **\*Jun. 27, 2023**

(54) SYSTEM AND METHOD FOR MONITORING, RECOMMENDING, UPDATING AND SUPPLYING MULTIFUNCTION PERIPHERAL FLEETS

(71) Applicant: Toshiba TEC Kabushiki Kaisha, Shinagawa-ku (JP)

(72) Inventors: Guillermo Hernandez Gallegos, Jalisco (MX); David Fuentes, Jalisco (MX); Kevin Marquez Vaca, Jalisco (MX); Daniel Garcia Zuñiga, Jalisco (MX); Carlos Perez Hermosillo, Jalisco (MX)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,334

(22) Filed: Apr. 7, 2022

(65) Prior Publication Data
US 2022/0272213 A1   Aug. 25, 2022

Related U.S. Application Data

(63) Continuation of application No. 17/180,222, filed on Feb. 19, 2021, now Pat. No. 11,310,373.

(51) Int. Cl.
*H04N 1/08* (2006.01)
*H04N 1/00* (2006.01)
*H04L 67/12* (2022.01)

(52) U.S. Cl.
CPC ..... *H04N 1/00344* (2013.01); *H04N 1/00244* (2013.01); *H04N 1/00493* (2013.01); *H04L 67/12* (2013.01); *H04N 2201/0094* (2013.01)

(58) Field of Classification Search
CPC .......... H04N 1/00344; H04N 1/00244; H04N 1/00943; H04N 2201/0094
(Continued)

(56) References Cited

U.S. PATENT DOCUMENTS 10,868,927 B1 * 12/2020 Kodimer ............ H04N 1/00395
2006/0290680 A1 * 12/2006 Tanaka ............... H04N 1/32539
  345/173
2017/0262867 A1   9/2017 Hagiwara

FOREIGN PATENT DOCUMENTS

EP          1919183          5/2008

\* cited by examiner

*Primary Examiner* — Ibrahim Siddo
(74) *Attorney, Agent, or Firm* — Ulmer & Berne LLP; John X. Garred (57) ABSTRACT

A system and method for maintenance and supplying of a fleet of multifunction peripheral devices includes two or more networked devices including a decision engine. Devices discover one another and one device is designated as a server. The server creates a virtual lobby accessible by other devices and its decision engine is enabled. The server invites other devices into its virtual lobby, and these devices join the lobby in response. Devices provide their device state information to the lobby. The enabled decision engine generates recommendations for consumable replenishment, device servicing or device configuration, relaying the recommendations to a system administrator's tablet or smartphone. The administrator may accept, reject, modify or implement received suggestions. Consumable supplies or servicing recommendations can be done automatically if enabled. Administrator actions are fed back to the server for machine learning to improve future suggestions.

20 Claims, 6 Drawing Sheets

(58) Field of Classification Search
USPC .............................. 358/1.15, 1.13, 1.14, 1.1
See application file for complete search history.

Each MFP starts data communication with other MFPs

Note: External network not required for MFPs information Logic decisions

FIG. 8 ical Field

This application relates generally to management of groups of multifunction peripherals. The application relates more particularly to automated interaction between a fleet of multifunction peripherals to provide device configuration suggestions, maintenance recommendations, supply recommendations or supply orders to an administrator's handheld digital device.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Many businesses have a large number of MFPs in service. It may be extremely difficult to determine what could be done to improve device operations or user convenience for a large number, or fleet, of such devices.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Example embodiments herein include a software engine running in each of a group or fleet of MFPs. Device management and communication is accomplished with any suitable protocol. An example protocol uses a SNMP OID (Simple Network Management Protocol Object Identifier) to manage compatible device's status. Devices are in data communication with one another and decide as a group as to whether they need to order supplies, need reconfiguration or updating, or need any kind of service, such as service requiring a technician visit. Decisions are intelligent and optimized for the MFP fleet.

In further example embodiments, an assisting device such as any handheld digital device such as a tablet, smartphone or custom device, alerts a user, such as an MFP administrator, of the fleet's decision and suggestions. Then, if the user has set up a favorite or custom dealer, the system is enabled to auto-order supplies based on the fleet's own needs, making purchase of new supplies automatic.

Each MFP discovers its peer devices, suitably with SNMP discovery, to find fleet members within a network or network subnet. When MFPs discover each other, they commence data communication. One MFP is designated as a server, suitably with a server token. The server creates a "lobby" and invites other MFPs to join the lobby, suitably using SNMP compatible devices. This lobby concept can be used in video game online match making lobbies wherein any device can act as a server at any time and invite others to join a lobby. As used herein, a lobby provides for data interchange between peer participants in an open and collaborative manner. Once the fleet devices are in the lobby they query one another relative to each MFPs status and needs. Such queries include device state, configuration, usage levels, consumable levels, and the like. Examples of queried information can include: device counters, such as page counts; supported color types or black-and-white only; consumable levels, such as toner, ink, paper or staples; status alerts, such as service needed, paper jams or device malfunctions; fatal errors; service request; or hardware failures.

A decision engine running on the acting server device will collect all this data and analyze it via artificial intelligence and machine learning to generate a decision on what is best for the entire fleet. By way of example, the decision engine can check against user-set consumable thresholds, such as when 10% or 20% of toner remains, to support a group decision. Once a group decision is made, the engine notifies the user that the fleet, or a fleet device, needs their attention via their mobile device. When an auto decide and act feature is enabled, supplies or servicing for the fleet device is automatically sent to a pre-designated MFP dealer. Engine requests are suitably routed to a mobile device wherein an administrator may order supplies, schedule service, update settings, update configurations, or place a service request.

The decision engine is versatile and failure tolerant. If an acting server becomes unresponsive for any reason, the server token can be passed to any of the other instances of the engine, which means any available MFP in the network fleet. The decision engine gathers fleet data, suitably through SNMP discovery and SMNP IOD's, to come to a group decision, such as by use of a consensus algorithm, to come up with solutions to problems reported by fleet. The decision engine suitably communicates in a "swarm model" with other MFPs within a network. The decision engine suitably gathers MFP data to reach a group consensus in order to create consumable or servicing predictions, detect issues and prevent downtime.

The user, such as an administrator, is notified of the fleet's findings, needs and alerts, such as when toner is needed for different devices. The decision engine determines an optimum point for ordering new toner, types and models according to the fleet's particular needs. The decision engine also notifies when a particular device needs service from an MFP technician. Such decisions are based in part on device counter and usage values, allowing detecting that certain devices are being used less than others, and this can be called to the user's attention.

The decision engine suitably notifies an administrator via their hand held wireless device and presents a status report, suitably asking for confirmation to take action automatically. The user device suitably connects and authenticates with a server MFP wirelessly, such as via Wi-Fi Direct, Bluetooth or near-field communication (NFC). The decision engine also suitably sends an email to notify the user, or via a mobile app running in the tablet, smartphone or other handheld device. The mobile app also functions to communicate with a supplier or dealer, such as a toner supplier, using preset payment information such as a credit card, debit card, account number or job information for invoicing. The mobile device is configured to generate reports, such as expense reports, suitably by month, by quarter, or by year, for business purposes. Delivery information, such as device location, is pre-stored to facilitate delivery to any MFP.

Figure 1:
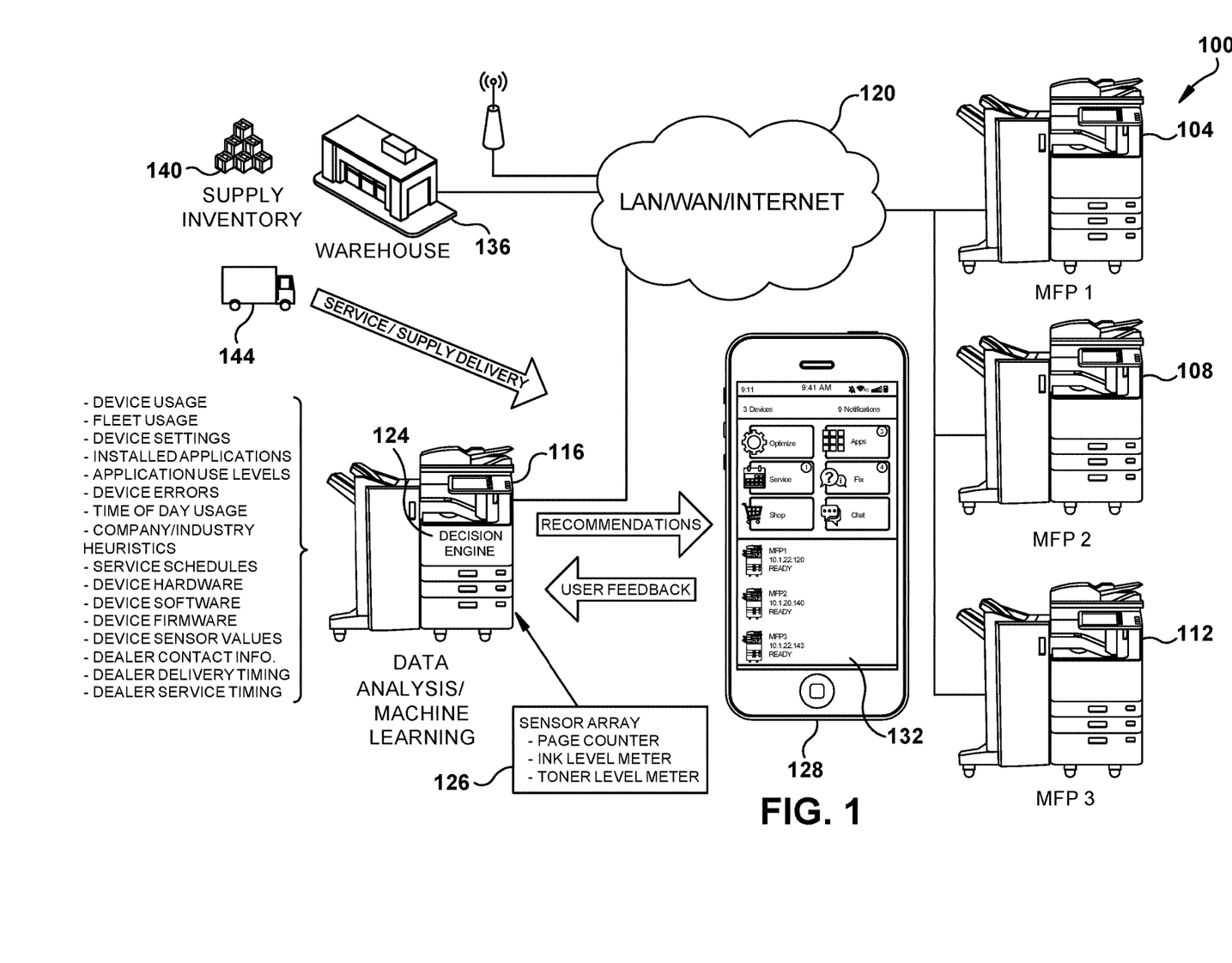
FIG. 1 is an example embodiment of a system for monitoring, recommending, supplying and updating MFP fleets.

FIG. 1 illustrates an example embodiment of a system 100 for monitoring, recommending, supplying and updating MFP fleets. Two or more networked MFPs are illustrated by MFPs 104, 108, 112 and 116, which plurality of MFPs forms a fleet. The MFPs are in mutual data communication by network cloud 120, suitably comprised of a local area network (LAN), wide area network (WAN) which may comprise the Internet, or any combination thereof. Network connectivity is provided by any suitable wireless or wired technology. Operation of example embodiments disclosed herein are operable solely within a LAN or subnet. WAN or Internet connectivity is not required.

In the example embodiment of FIG. 1, all MFPs are operable as a server. One MFP, MFP 116 in the example, is designated as a server, suitably with a server token 134. In the event a designated server is problematic, server token 134 may be moved to any other MFP in the network. MFP 116, as well as MFPs 104, 108 and 112 include a sensor array 126 providing device state information such as page counts or consumable levels, such as toner or ink. Server MFP 116 is operable with a decision engine 124. A decision engine is a piece of software that executes rules according to some algorithm. The decision engine 124 combines a set of facts that are inserted in to the system with a rule set to reach a conclusion of triggering one or several actions. These rules describe, in a declarative manner, logic which needs to be implemented in an MFP fleet environment. Rules are applied to factual information. Such factual information includes data collected from the fleet of MFPs. As noted above, MFPs discover one another and provide information to the server via a virtual lobby. Information includes, but is not limited to, device usage information, device settings, installed applications, application use levels, device errors, time of day usage, company/industry heuristics, service schedules, device hardware, device software, device firmware or device sensor values.

Decision engine 124 logic or rules, are pieces of knowledge suitably expressed as, "When some conditions are evaluated to true, then do some tasks". A system with a large number of rules and facts may result in many rules being true for the same facts. In such instances, rules are defined to be in conflict. The decision engine 124 suitably uses conflict resolver strategies to determine the order of execution of the conflict rules. In the subject decision engine, there are two execution methods:

Forward Chaining: is a "data-driven" method. Upon MFP supplied information being supplied or updated, the decision engine 124 uses available facts and inference rules to extract more facts until a recommendation is reached, where one or more matching rules will be concurrently true and scheduled for execution. Hence the decision engine 124 starts with facts and ends with recommendations.

Backward chaining is a "goal-driven" or inference method, which is reversed with forward chaining. Backward chaining starts with a conclusion or recommendations that the decision engine 124 tries to satisfy. If it cannot satisfy these goals, then it searches for sub-goals that it can satisfy that will help satisfy some part of the current goals. The decision engine 124 continues this process until either the initial conclusion is proven or there are no more sub-goals.

Also illustrated in FIG. 1 is a handheld data device 128, illustrated as a smartphone, but which can be any suitable data device, such as a notebook computer, tablet computer, and the like. When recommendations are issued from the decision engine 124 of MFP 116, they are routed to a handheld data device 128 associated with a user, such as a system administrator. An administrator can implement recommendations as given, implement a modified recommendation, or ignore a recommendation. Actions taken by the user are fed back to the decision engine 124 of MFP 116 providing updated information for machine learning, allowing for additional, updated or modified rule generation for improved future fleet recommendations. Machine learning is suitably implemented on commercially available software, such as TensorFlow, Amazon Machine Learning, Accord. NET or Apache Mahout.

Handheld data device 128 includes a touchscreen user interface 132 to display received recommendations and provide user feedback. When a received recommendation includes one of consumable replacement or device service, the user may place orders manually or elect to have associated orders placed automatically with one or more preselected providers, contact information for which may be stored in the memory of an MFP, portable data device, or both. In the illustrated example, an order is suitably placed to a supplier, such as a MFP dealer warehouse 136. Orders are filled from inventory 140 for shipment 144.

Figure 2:
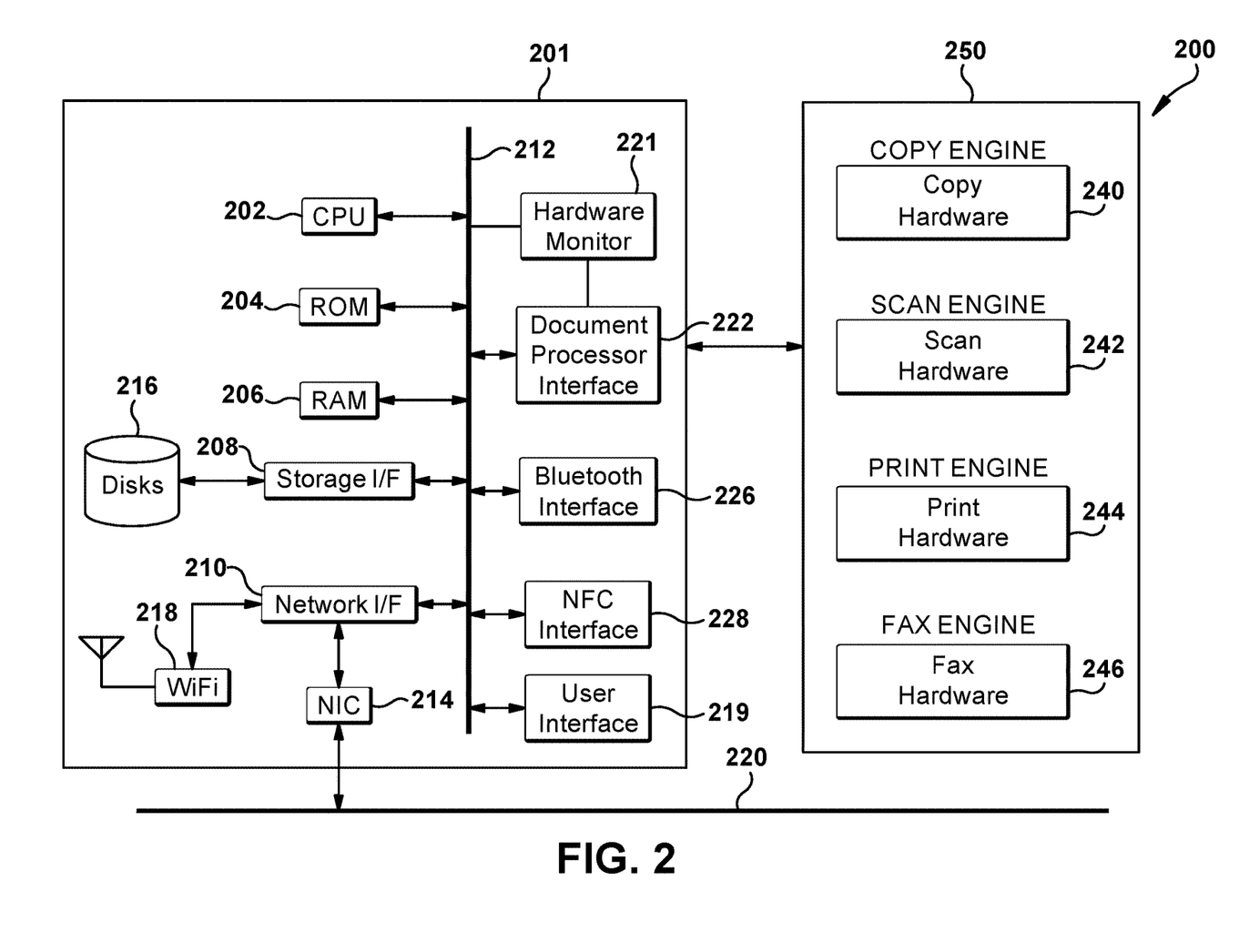
FIG. 2 is an example embodiment of a networked digital device comprising a document rendering system.

Turning now to FIG. 2 illustrated is an example embodiment of a networked digital device comprised of document rendering system 200 suitably comprised within an MFP, such as with MFPs 104, 108, 112 and 116 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as Wi-Fi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication with a document processor interface 222, with Bluetooth interface 226 and NFC interface 228 via data bus 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrated example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional units 250. It will be understood that functional units are suitably comprised of intelligent units, including any suitable hardware or software platform.

Figure 3:
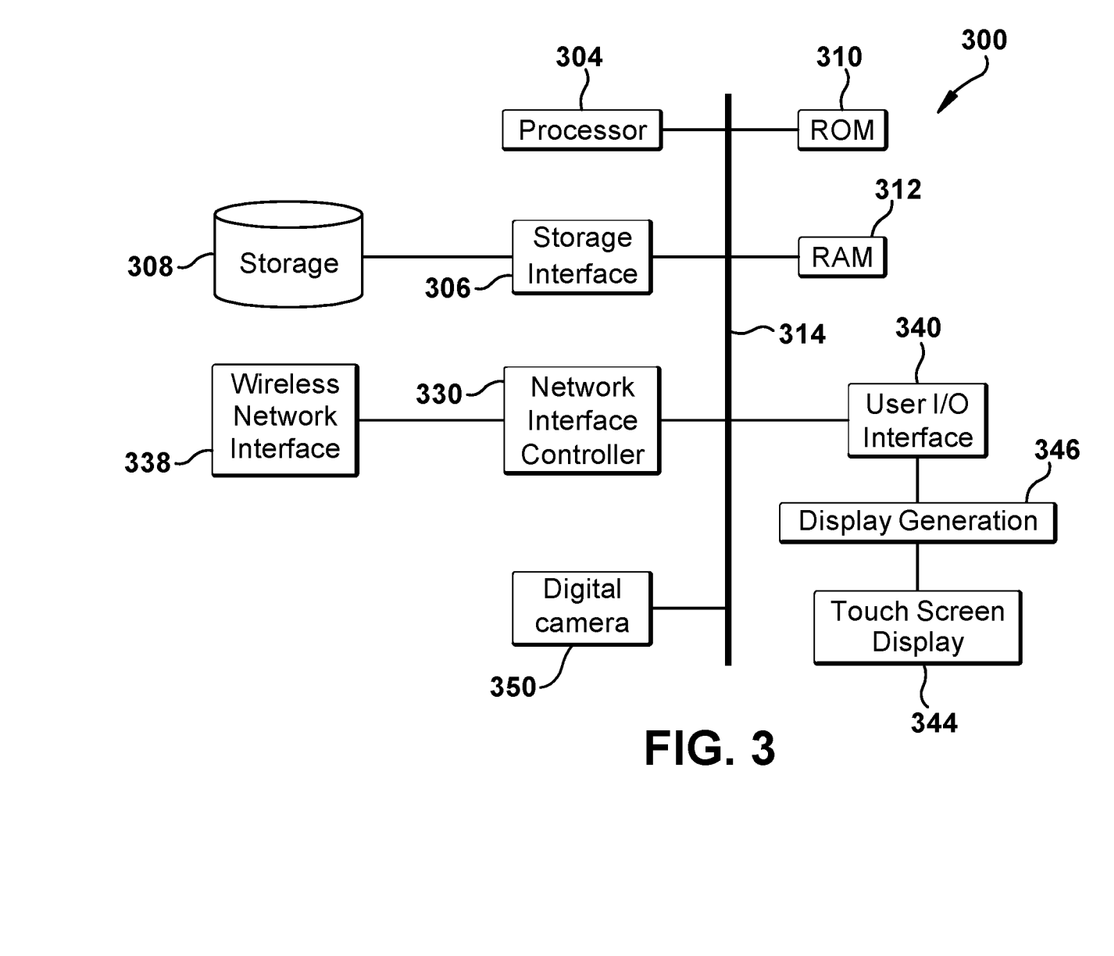
FIG. 3 is an example embodiment of a digital device system such as a smartphone or tablet computer.

Turning now to FIG. 3, illustrated is an example of a digital device system 300 suitably comprising handheld data device 128 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably made with an MFP or server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
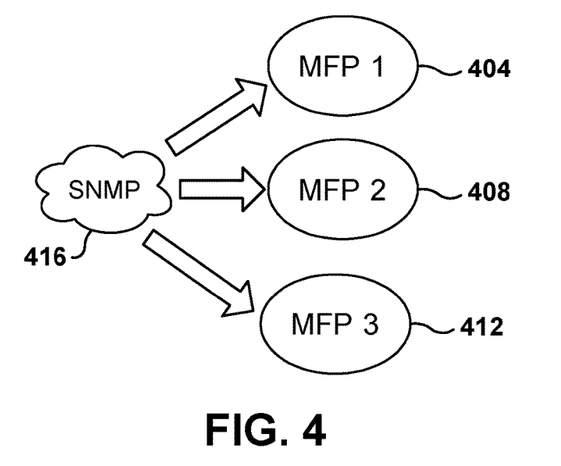
FIG. 4 illustrates a sequence step for monitoring, recommending, supplying and updating MFP fleets.
Figure 5:
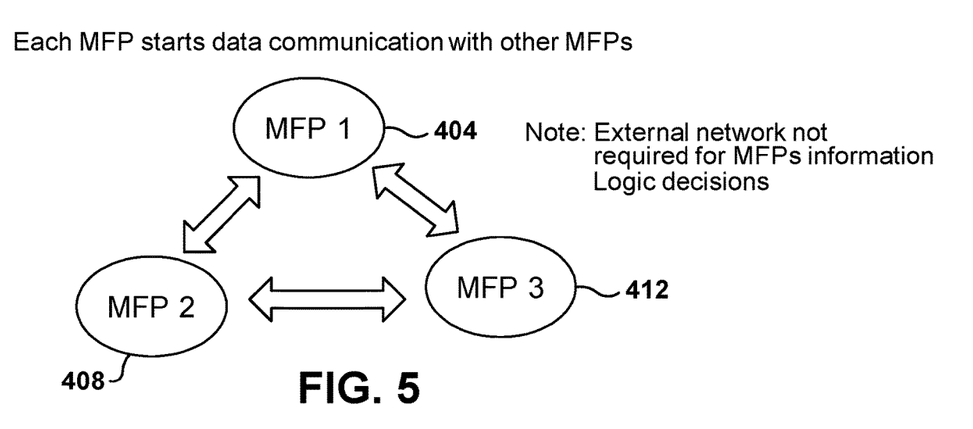
FIG. 5 illustrates another sequence step for monitoring, recommending, supplying and updating MFP fleets.
Figure 6:
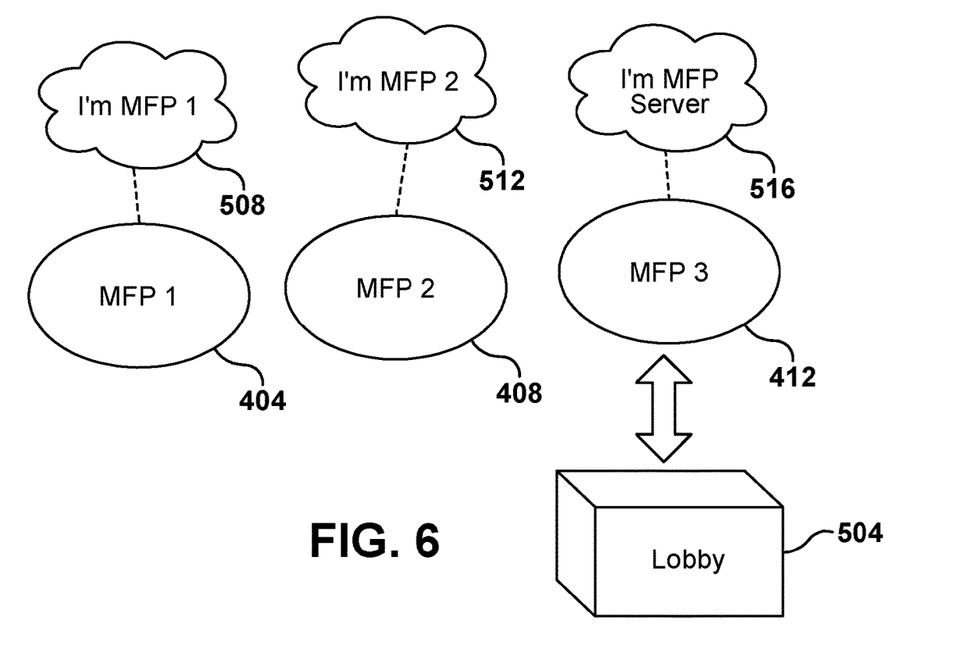
FIG. 6 illustrates another sequence step for monitoring, recommending, supplying and updating MFP fleets.
Figure 7:
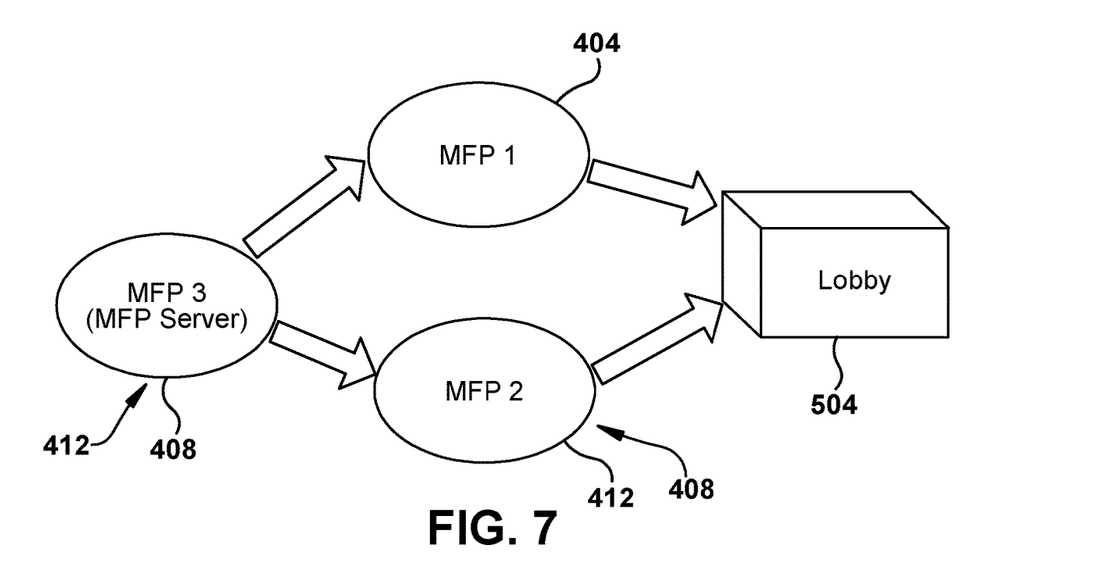
FIG. 7 illustrates another sequence step for monitoring, recommending, supplying and updating MFP fleets.

FIGS. 4-7 illustrate an example sequence for monitoring, recommending, supplying and updating MFP fleets. FIG. 4 illustrates MFPs 404, 408 and 412 running SNMP 416 to facilitate device discovery and device information reporting. FIG. 5 illustrates communication sessions between MFPs 404, 408 and 412. FIG. 6 illustrates MFPs broadcasting their presence to a network cloud, illustrated by 508, 512 and 516. MFP 412 is designated as a server and informs MFPs 408 and 412. MFP 412, as server, forms a lobby 504. FIG. 7 illustrates server MFP 412 inviting MFPs 404 and 408 into lobby 504.

Figure 8:
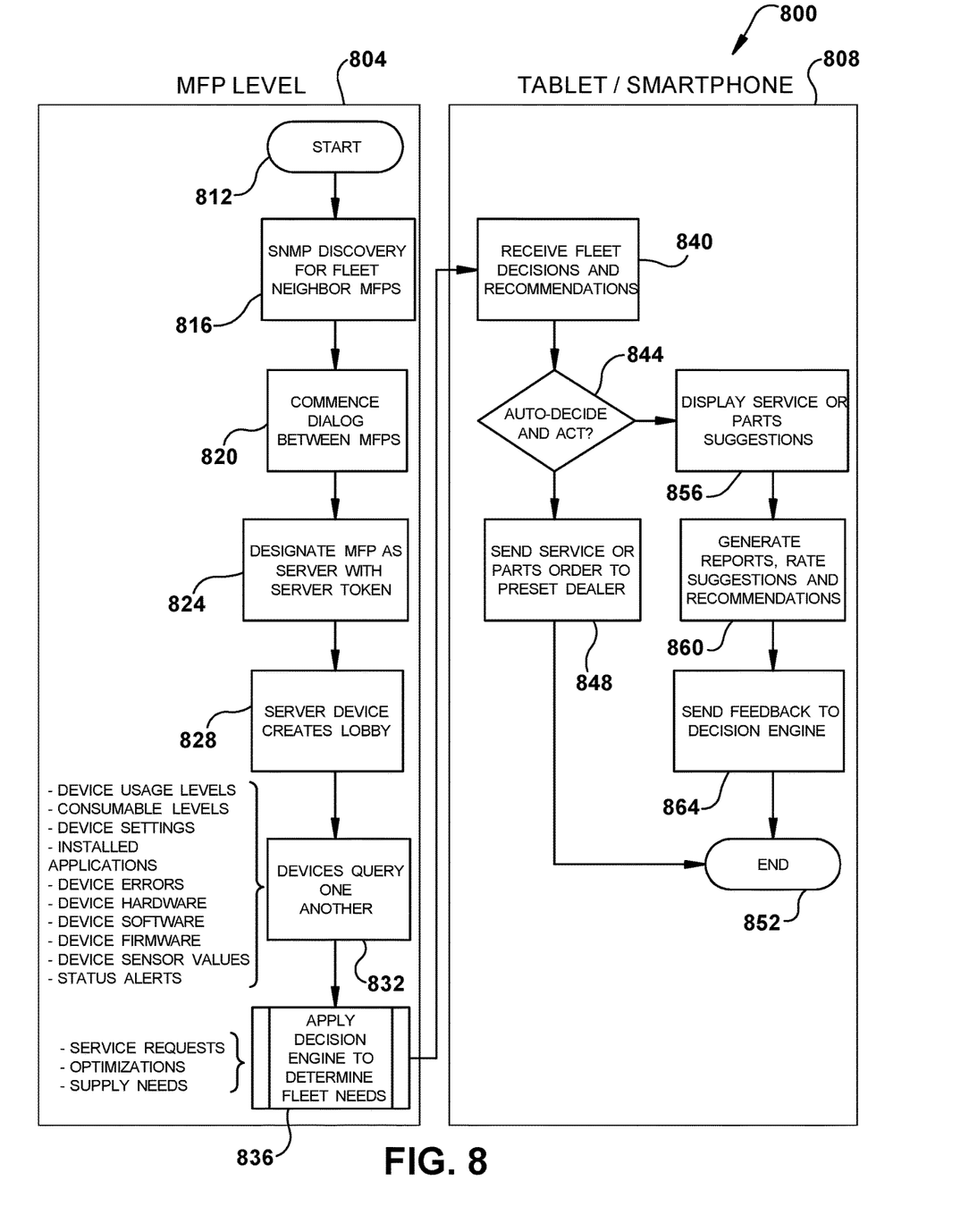
FIG. 8 is a flowchart of an example embodiment for monitoring, recommending, supplying and updating MFP fleets.

FIG. 8 illustrates a flowchart 800 of an example embodiment of a system for monitoring, recommending, supplying and updating MFP fleets. Flowchart 800 includes portion 804 implemented at an MFP level and portion 808 implemented by a portable data device such as a tablet or smartphone. The process commences at block 812 at the MFP level and proceeds to block 816 wherein SNMP discovery occurs between a fleet of MFPs. A data communication dialog between the MFPs is commenced at block 820, and a server is designated at block 824 with a server token. A designated server creates a lobby at block 828, and queries other MFPs for device information at block 832. Device information is applied to a decision engine at block 836, resulting in suggestions for consumable ordering, device servicing, device configuration, and the like.

Suggestions from the MFP level are received by a user's tablet or smartphone at block 840. If a suggestion includes ordering such as for consumables or servicing, a test is made at block 844 to see if auto-ordering is enabled. If so, an order is automatically generated and sent to a preset dealer for fulfillment, and ordering suggestions terminated at block 848. If auto-ordering is not enabled, corresponding suggestions are displayed to the user, along with any non-order related suggestions, at block 856. Reports are generated, and suggestions and recommendations rated, modified and selectively implemented at block 860. Feedback from such rating, modification and implementation is sent to the decision engine at block 864 for improved decision rendering by applied machine learning. The process ends at block 852.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a fleet of MFPs, the fleet of MFPs comprising a plurality of networked MFPs, each of the plurality of networked MFPs including,
a document processing engine including a scanner and a printer,
memory storing current device status data received from the device sensors,
a network interface,
a processor configured to discover other MFPs of the plurality of networked MFPs via the network interface; and
a server token stored in a server memory of one of the plurality of networked MFPs designating it as a designated fleet server for the plurality of networked MFPs;
wherein the designated fleet server includes,
the server processor further configured to send an electronic invitation to the other MFPs via the network interface,
the processor further configured to receive device status data from each of the plurality of networked MFPs via the network interface to generate fleet device data, the server processor further configured to engage a decision engine to analyze the fleet device data to determine needs of the fleet of MFPs, the server processor further configured to generate a notification relative to determined needs of the fleet of MFPs, and the server processor further configured to communicate the notification to an associated user device via a wireless data interface.

2. The system of claim 1 wherein status date includes one or more of MFP counter values, consumable levels, device capabilities, device configuration and device status alerts.

3. The system of claim 2 wherein the decision engine includes a comparison of fleet device data to one or more preset threshold values for consumable levels.

4. The system of claim 3 wherein the notification includes one or more of a need for consumable replenishment, a need for device servicing, and suggested or recommend device reconfiguration.

5. The system of claim 4 further comprising a portable data device including,
portable data device memory;
a user interface including a user input and a display;
a portable data device wireless data interface configured to receive the notification into memory;
a portable data device processor configured to show the notification on the display;
the portable data device processor further configured to receive user feedback relative to a received notification from an associated user via the user interface; and
the portable data device processor further configured to communicate the user feedback to the decision engine via the wireless data interface.

6. The system of claim 5 wherein the decision engine includes application of machine learning to the user feedback to analyze the fleet device data.

7. The system of claim 5 wherein the portable data device memory includes dealer contact data and wherein the portable data device processor is further configured to:
receive the notification including a need for consumable replenishment; and
automatically send a consumable order to a dealer associated with the dealer contact data responsive to the notification when preset to do so.

8. The system of claim 5 wherein the portable data device memory includes dealer contact
data and wherein the portable data device processor is further configured to:
receive the notification including a need device service; and
automatically send a device service order to a dealer associated with the dealer contact data responsive to the notification when preset to do so.

9. A method comprising:
in each of a plurality of networked MFPs, each of the plurality of networked MFPs including a processor, server memory and a document processing engine including a scanner and a printer,
generating current MFP status data,
storing the current device status data in a memory,
discovering other MFPs of the plurality of networked MFPs via a network interface; and
designating one of the plurality of networked MFPs as a designated fleet server for the plurality of networked MFPs in accordance with a server token;
in the designated fleet server,
sending an electronic invitation to the other MFPs via the network interface,
receiving device status data from each of the plurality of networked MFPs via the network interface to generate fleet device data,
engaging a decision engine to analyze the fleet device data to determine fleet needs,
generating a notification relative to determined fleet needs, and
communicating the notification to an associated user device via a wireless data interface.

10. The method of claim 9 wherein status date includes one or more of MFP counter values, consumable levels, device capabilities, device configuration and device status alerts.

11. The method of claim 10 further comprising comparing, via the decision engine, the fleet device data to one or more preset threshold values for consumable levels.

12. The method of claim 11 wherein the notification includes one or more of a need for consumable replenishment, a need for device servicing, and suggested or recommend device reconfiguration.

13. The method of claim 12 further comprising:
in a portable data device having a portable data device processor, a portable data device memory, a wireless data interface, and a user interface including a display,
receiving the notification into the portable data device memory;
showing the notification on the display;
receiving user feedback relative to a received notification from an associated user via the user interface; and
communicating received user feedback to the decision engine via the wireless data interface.

14. The method of claim 13 wherein machine learning is utilized in the decision engine to receive user feedback to analyze the fleet device data.

15. The method of claim 13 further comprising:
in the portable data device,
receiving the notification including a need for consumable replenishment, and
automatically sending a consumable order to a dealer associated with preset dealer contact data responsive to the notification when preset to do so.

16. The method of claim 13 further comprising:
in the portable data device,
receiving the notification including a need for device service, and
automatically sending a device service order to a dealer associated with the preset dealer contact data responsive to the notification when preset to do so.

17. A system comprising:
a plurality of networked MFPs, each of the plurality of networked MFPs including,
a document processing engine including a scanner and a printer,
memory storing current device status data including a page count and consumable level,
a network interface,
a processor configured to discover other MFPs of the plurality of networked MFPs via the network interface, and
a server subsystem operational in response to a received server token, the server subsystem configured to,
send an electronic invitation to the other MFPs via the network interface,
receive device status data from each of the plurality of networked MFPs via the network interface to generate fleet device data,
engage a decision engine to analyze the fleet device data to determine fleet needs in accordance with machine learning, determine fleet consumable needs and fleet servicing needs in accordance with the decision engine, generate recommendations relative to determined fleet consumable or service needs, and communicate the recommendations to an associated user device via a wireless data interface;

a server token resident on one of the plurality of networked MFPs designating it as a designated fleet server and enabling its server subsystem; and a portable data device including, portable data device memory, a user interface including a user input and a display, a portable data device wireless data interface configured to receive the recommendations into memory, a portable data device processor configured to show the recommendations on the display, the portable data device processor further configured to receive user feedback relative to rating or ranking of the recommendations from an associated user via the user interface, and the portable data device processor further configured to communicate received user feedback to the decision engine via the wireless data interface.

18. The system of claim 17 wherein a server processor is further configured to transfer the server token to a different MFP of the plurality of networked MFPs when an operational issue affects the designated fleet server.

19. The system of claim 17 wherein the portable data device processor is further configured to communicate an order for consumable or service to an associated dealership responsive a received notification.

20. The system of claim 17 wherein the recommendations include modified device settings, software modifications or hardware modifications.

\* \* \* \* \*